US012563024B2

(12) United States Patent
Gaist

(10) Patent No.: US 12,563,024 B2
(45) Date of Patent: Feb. 24, 2026

(54) CONTINUOUS UNIVERSAL TRUST ARCHITECTURE AND METHOD

(71) Applicant: Cortwo Corp., Dallas, TX (US)

(72) Inventor: Nir Gaist, Dallas, TX (US)

(73) Assignee: Noetic Global Corp., Dallas, TX (US)

( * ) Notice: Subject to any disclaimer, the term of this patent is extended or adjusted under 35 U.S.C. 154(b) by 0 days.

(21) Appl. No.: 19/211,829

(22) Filed: May 19, 2025

(65) Prior Publication Data

US 2026/0019409 A1     Jan. 15, 2026

Related U.S. Application Data

(62) Division of application No. 18/771,253, filed on Jul. 12, 2024, now Pat. No. 12,309,132.

(51) Int. Cl.
  *H04L 9/40*       (2022.01)
  *H04L 45/64*      (2022.01)

(52) U.S. Cl.
  CPC .............. *H04L 63/08* (2013.01); *H04L 45/64* (2013.01)

(58) Field of Classification Search
  CPC ................................ H04L 63/08; H04L 45/64
  See application file for complete search history.

(56) References Cited

U.S. PATENT DOCUMENTS 6,252,964 B1 * 6/2001 Wasilewski ...... H04N 21/23476
                                                  380/282
7,283,822 B2 * 10/2007 Gallagher ............. H04W 60/04
                                                  455/411

7,990,945 B1 * 8/2011 Johri ..................... H04L 41/044
                                                  370/392
8,577,355 B1 * 11/2013 Shaw .................... H04L 67/306
                                                  455/418
9,049,030 B1 * 6/2015 Pogde .................... H04L 12/18
9,252,972 B1 * 2/2016 Dukes .................... H04L 49/70
10,148,550 B1 * 12/2018 Murphy ................. H04L 45/22
10,341,867 B1 * 7/2019 Kadmon .............. H04W 8/005
10,541,919 B1 * 1/2020 Hooda .................. H04L 63/065

(Continued)

OTHER PUBLICATIONS

International Search Report and Written Opinion, PCT/US2025/037284, mail Dec. 12, 2025.

*Primary Examiner* — Aravind K Moorthy
(74) *Attorney, Agent, or Firm* — David H. Judson

(57) ABSTRACT

A method for continuous "universal" trust (CUT) leverages a core network that manages authentication set-up and continuous trust logic for entities that use the network. During communications through the network, and regardless of source or destination, CUT logic is applied to each entity independently, and without requiring authentication to be done directly between entities that desire to communicate with one another. In a typical implementation involving a user and a service, CUT authenticates both user and service independently. To facilitate both initial and continuous authentication, a CUT engine applies authentication factors to an entity, independently of factors that may be applied by the CUT entity to any other entity that uses the network. In this solution, the CUT engine continues to authenticate and maintain trust between each entity and the core network, irrespective of the underlying communication to be carried out or occurring between the entities themselves.

9 Claims, 2 Drawing Sheets

(56) References Cited

U.S. PATENT DOCUMENTS

| | | | | |
|---|---|---|---|---|
| 11,909,716 | B1* | 2/2024 | Bhatia | H04L 61/5084 |
| 12,336,026 | B2* | 6/2025 | Purkayastha | H04W 76/40 |
| 2001/0053226 | A1* | 12/2001 | Akins, III | H04L 63/123 |
| | | | | 380/282 |
| 2003/0140131 | A1* | 7/2003 | Chandrashekhar | |
| | | | | H04L 63/0272 |
| | | | | 709/223 |
| 2005/0078824 | A1* | 4/2005 | Malinen | H04L 63/0876 |
| | | | | 455/410 |
| 2005/0148321 | A1* | 7/2005 | Igarashi | H04L 63/102 |
| | | | | 455/411 |
| 2005/0223222 | A1* | 10/2005 | Graves | H04L 9/0894 |
| | | | | 713/165 |
| 2006/0128362 | A1* | 6/2006 | Bae | H04W 12/06 |
| | | | | 455/411 |
| 2006/0251008 | A1* | 11/2006 | Wu | H04W 88/08 |
| | | | | 370/328 |
| 2008/0130902 | A1* | 6/2008 | Foo Kune | H04L 63/065 |
| | | | | 380/286 |
| 2009/0258631 | A1* | 10/2009 | Forsberg | H04L 63/08 |
| | | | | 455/411 |
| 2010/0048174 | A1* | 2/2010 | Osborn | H04W 60/04 |
| | | | | 455/411 |
| 2010/0048175 | A1* | 2/2010 | Osborn | H04W 12/069 |
| | | | | 455/411 |
| 2012/0042071 | A1* | 2/2012 | Ponnuswamy | H04L 63/0876 |
| | | | | 709/225 |
| 2012/0135711 | A1* | 5/2012 | Jabara | H04N 21/4367 |
| | | | | 455/411 |
| 2012/0303831 | A1* | 11/2012 | Toshniwal | H04L 65/1069 |
| | | | | 709/229 |
| 2013/0083691 | A1* | 4/2013 | Murphy | H04L 41/0886 |
| | | | | 370/254 |
| 2013/0083724 | A1* | 4/2013 | Sindhu | H04L 45/50 |
| | | | | 370/328 |
| 2014/0273965 | A1* | 9/2014 | Raleigh | H04L 63/08 |
| | | | | 455/411 |
| 2014/0282850 | A1* | 9/2014 | Mattes | H04L 63/06 |
| | | | | 726/1 |
| 2015/0043329 | A1* | 2/2015 | Ashtaputre | H04L 12/1886 |
| | | | | 370/219 |
| 2015/0089594 | A1* | 3/2015 | Subramanian | H04L 63/08 |
| | | | | 726/4 |
| 2015/0138963 | A1* | 5/2015 | Lee | H04W 48/04 |
| | | | | 370/230 |
| 2015/0288690 | A1* | 10/2015 | Pal | H04L 9/3242 |
| | | | | 713/181 |
| 2015/0363582 | A1* | 12/2015 | Sheller | G06F 21/31 |
| | | | | 726/17 |
| 2016/0191663 | A1* | 6/2016 | Qiu | H04L 65/80 |
| | | | | 709/207 |
| 2017/0118235 | A1* | 4/2017 | Kang | H04L 43/0876 |
| 2017/0325270 | A1* | 11/2017 | Tenny | H04W 76/14 |
| 2017/0346823 | A1* | 11/2017 | Wadley | G06Q 50/01 |
| 2018/0332017 | A1* | 11/2018 | Childress | H04L 63/08 |
| 2018/0359337 | A1* | 12/2018 | Kodaypak | H04L 12/1886 |
| 2019/0068614 | A1 | 2/2019 | Bhatnagar et al. | |

| | | | | |
|---|---|---|---|---|
| 2019/0141527 | A1* | 5/2019 | Krishan | H04W 8/04 |
| 2019/0207927 | A1* | 7/2019 | Lakhani | G06F 21/42 |
| 2019/0306025 | A1* | 10/2019 | Dunn | H04L 63/08 |
| 2020/0028690 | A1* | 1/2020 | Barakat | H04L 9/3247 |
| 2020/0084663 | A1* | 3/2020 | Park | H04W 8/08 |
| 2020/0107213 | A1* | 4/2020 | Park | H04M 15/66 |
| 2020/0195656 | A1* | 6/2020 | Marsh | H04L 63/107 |
| 2020/0322262 | A1* | 10/2020 | Maino | H04L 45/64 |
| 2020/0389796 | A1* | 12/2020 | Olofsson | H04L 63/0892 |
| 2020/0412556 | A1 | 12/2020 | Yoon et al. | |
| 2021/0058784 | A1* | 2/2021 | Kedalagudde | H04W 76/12 |
| 2021/0150016 | A1* | 5/2021 | Miyamoto | H04W 12/06 |
| 2021/0266234 | A1* | 8/2021 | Barnett, Jr. | H04L 47/765 |
| 2021/0281553 | A1* | 9/2021 | Ward | G06F 21/53 |
| 2021/0288808 | A1* | 9/2021 | Bahety | H04L 9/3247 |
| 2021/0400085 | A1* | 12/2021 | Stokes | H04L 63/20 |
| 2022/0038869 | A1* | 2/2022 | Avetoom | H04W 12/71 |
| 2022/0107998 | A1* | 4/2022 | Freckleton | G06F 21/34 |
| 2022/0124031 | A1* | 4/2022 | Padhye | H04L 43/50 |
| 2022/0255913 | A1* | 8/2022 | Zacks | H04W 12/065 |
| 2022/0286388 | A1* | 9/2022 | Mermoud | H04L 45/655 |
| 2022/0345452 | A1* | 10/2022 | Avetoom | H04L 69/40 |
| 2022/0353263 | A1* | 11/2022 | Choyi | H04L 12/12 |
| 2022/0406304 | A1* | 12/2022 | Marzorati | G06F 3/167 |
| 2022/0408423 | A1* | 12/2022 | Ljung | H04W 72/20 |
| 2022/0417737 | A1* | 12/2022 | Zhang | H04L 61/5092 |
| 2023/0101303 | A1* | 3/2023 | Tammana | H04L 63/0815 |
| | | | | 726/8 |
| 2023/0106757 | A1* | 4/2023 | Tang | H04W 40/246 |
| | | | | 370/252 |
| 2023/0145044 | A1* | 5/2023 | Ben Henda | H04L 63/0892 |
| | | | | 370/329 |
| 2023/0171824 | A1* | 6/2023 | Purkayastha | H04W 76/40 |
| | | | | 370/310 |
| 2023/0198738 | A1* | 6/2023 | Avikkal | H04J 3/0667 |
| | | | | 370/503 |
| 2023/0379994 | A1* | 11/2023 | Movva | H04W 12/50 |
| 2023/0388964 | A1* | 11/2023 | Guo | H04W 72/543 |
| 2023/0412594 | A1* | 12/2023 | Grover | H04L 63/0876 |
| 2024/0031347 | A1* | 1/2024 | Mantha | H04L 63/08 |
| 2024/0049103 | A1* | 2/2024 | Sabate | H04W 40/02 |
| 2024/0064055 | A1* | 2/2024 | Huang | H04L 45/02 |
| 2024/0113902 | A1* | 4/2024 | Michaelis | H04L 9/50 |
| 2024/0129807 | A1* | 4/2024 | Bashir | H04W 36/0022 |
| 2024/0143708 | A1* | 5/2024 | Khatri | G06F 21/31 |
| 2024/0147232 | A1* | 5/2024 | Viswambharan | H04W 12/06 |
| 2024/0196220 | A1* | 6/2024 | Neidlinger | H04W 12/63 |
| 2024/0205677 | A1* | 6/2024 | Barbu | H04W 12/06 |
| 2024/0214804 | A1* | 6/2024 | Zhang | H04W 12/06 |
| 2024/0244042 | A1* | 7/2024 | Khan | H04L 51/063 |
| 2025/0016270 | A1* | 1/2025 | Giagnocavo | H04L 65/70 |
| 2025/0016607 | A1* | 1/2025 | Vemuri | H04L 65/612 |
| 2025/0031039 | A1* | 1/2025 | Fu | H04L 12/283 |
| 2025/0031090 | A1* | 1/2025 | Tonesi | H04L 47/2475 |
| 2025/0097709 | A1* | 3/2025 | Balmakhtar | G06N 10/60 |
| 2025/0106631 | A1* | 3/2025 | Kim | H04W 60/00 |
| 2025/0124259 | A1* | 4/2025 | Prado | G06N 3/045 |
| 2025/0184325 | A1* | 6/2025 | Nalam | H04L 63/0876 |
| 2025/0202902 | A1* | 6/2025 | Long | G06F 21/604 |
| 2025/0227099 | A1* | 7/2025 | Jost | H04L 63/08 |

* cited by examiner

CONTINUOUS UNIVERSAL TRUST ARCHITECTURE AND METHOD

BACKGROUND OF THE INVENTION

This disclosure relates generally to trust-based network technologies and services.

Conventional network security has focused on network perimeter defenses, but many organizations no longer have a clearly-defined network perimeter. Remote work environments and the extensive use of mobile computing devices have dissolved traditional network boundaries. To protect a modern digital enterprise, organizations need a comprehensive strategy for secure access to their corporate resources, regardless of where they are located or how they are configured. To address this need, a security model, known as zero trust, has been developed. Zero trust security provides network security in which no entity is trusted by default from inside or outside the network. Zero trust solutions work by establishing strong identity verification, validating device compliance prior to granting access, and ensuring least privilege access to only explicitly authorized resources.

Current tools and security technologies (e.g., login methods, Multiple Factor Authentication (MFA), CAPTCHA, behavioral-based and other solutions, whether basic or advanced) typically operate to facilitate trust/authentication per specific interaction, or set of interactions (i.e., a session), between a particular source (e.g., a user) and a particular destination (e.g., a service). Common implementations of such solutions, such as gateways, are positioned at or in association with the destination's premises, and they operate to identify and authenticate pre-defined users/connections that are targeting the specific service.

Continuous trust refers to the notion of trust that develops and/or evolves over time as a result of continuing interactions. For example, a system that provides contextual-based zero trust access may implement context-aware access controls that allow or authenticate access to protected resources after performing risk assessment based on security posture information; a continuous trust evaluation may then be implemented for each of the connected devices, users, and application instances in the operating environment. In this approach, the system may start with zero trust and gradually increase the trust score of a subject based on analysis of the network data, identity information, and security posture information. The system may then increase or decrease the trust level for the subject based on a risk score determined using the security posture information. A system of this type is described in U.S. Publication No. 2022/0210173.

While continuous trust solutions provide advantages, typically they are implemented on a per-site basis, and they are designed to operate within or in association with given network domains.

SUMMARY OF THE INVENTION

According to this disclosure, a method for continuous "universal" trust (CUT) leverages a core network that manages authentication set-up and continuous trust logic for all entities that use the network. During all communications through the network (e.g., through a dedicated CUT engine), and regardless of source or destination, the CUT logic is applied to each entity independently, and without requiring authentication to be done directly between entities that desire to communicate with one another. Thus, in a typical implementation involving a user and a service, CUT authenticates both user and service independently and separately.

To facilitate both initial and continuous authentication, the CUT engine applies one or more authentication factors to an entity, once again independently of factors that may be applied by the CUT entity to any other entity that uses the network. In this solution, the CUT engine continues to authenticate and maintain trust between each entity and the core network, irrespective of the underlying communication to be carried out or occurring between the entities themselves. Thus, if each of a pair of entities establishes trust through the core network, that trust is retained throughout the communication session that occurs between the pair. Further, the notion of universality as provided for herein means that the trust is retained not just between the pair of entities, but also universally across the core network. Thus, if a first entity independently (and separately from a second entity) has established trust with the core network, this trust is retained and applicable to other communications with the core network.

According to a more specific aspect, a method of continuous universal trust is carried out in a network operating environment. The method begins by configuring a secure communication path between each of set of first entities, and a second entity, wherein all traffic and data flows between a first entity and the second entity pass through the secure communication path, which in this embodiment corresponds to the core network referenced above. As explained, preferably all communications flow through the secure communication path, and each endpoint for a communication (e.g., between a given first entity and the second entity) is authenticated to the core network independently and continuously. During a communication session originating at each first entity and directed to the second entity, the following sub-steps are then carried out. Initially, a determination is made whether an authentication requirement associated with a permitted access to a protected resource has been met. The authentication requirement is specified in a security policy associated with a trust circle, and wherein the set of first entities comprise a trust circle. Upon a determination that the authentication requirement has been met, the first entity is permitted to access the protected resource associated with the second entity via the secure communication path. Based on one or more authentication factors and other data, and while the communication session persists, a determination is then made whether the authentication requirement should be modified (e.g., stepped-up, stepped-down, or the like). Upon a determination that the authentication factor should be modified, the authentication requirement is adjusted and then enforced for at least some remaining portion of the communication session.

Preferably, the above-described continuous trust establishment and enforcement is enabled for each of the first entities in the trust circle, and for the second entity, thereby providing for continuous universal trust with respect to all the traffic flows.

According to another aspect, a computing infrastructure is provided for continuous and universal trust in a network operating environment, including the publicly-routable Internet. In this environment, one or more first entities desire to obtain access to protected resources associated with one or more second entities. A subset of the first entities may be associated with one another in a trust circle, which is a logical entity over which a security policy is enforced. The infrastructure comprises a core network comprising a relay through which all traffic and data flows between any first entity and any second entity pass, together with a controller, which includes an authentication module, and a continuous trust engine. Preferably, each first entity and each second entity are independently and separately authenticated to the core network. For each communication session established between a first entity and a second entity, and in this embodiment, the controller is configured to: (i) determine whether an authentication requirement associated with a permitted access to a protected resource associated with the second entity has been met, (ii) upon a determination that the authentication requirement has been met, permitting the first entity to access the protected resource associated with the second entity via the secure communication path; (iii) based on one or more authentication factors and other data, determining whether the authentication requirement should be modified; (iv) upon a determination that the authentication factor should be modified, adjusting the authentication requirement; and (v) enforcing the adjusted authentication requirement for at least some remaining portion of the communication session.

Generalizing, in a preferred embodiment, the above-described trust circle paradigm is enforced for all interactions of an entity with other entities, such that every entity on the core network is trusted and each entity's trust is universal, rather than being built and managed on a per-interaction or per-service based security model.

DETAILED DESCRIPTION OF THE INVENTION

Figure 1:
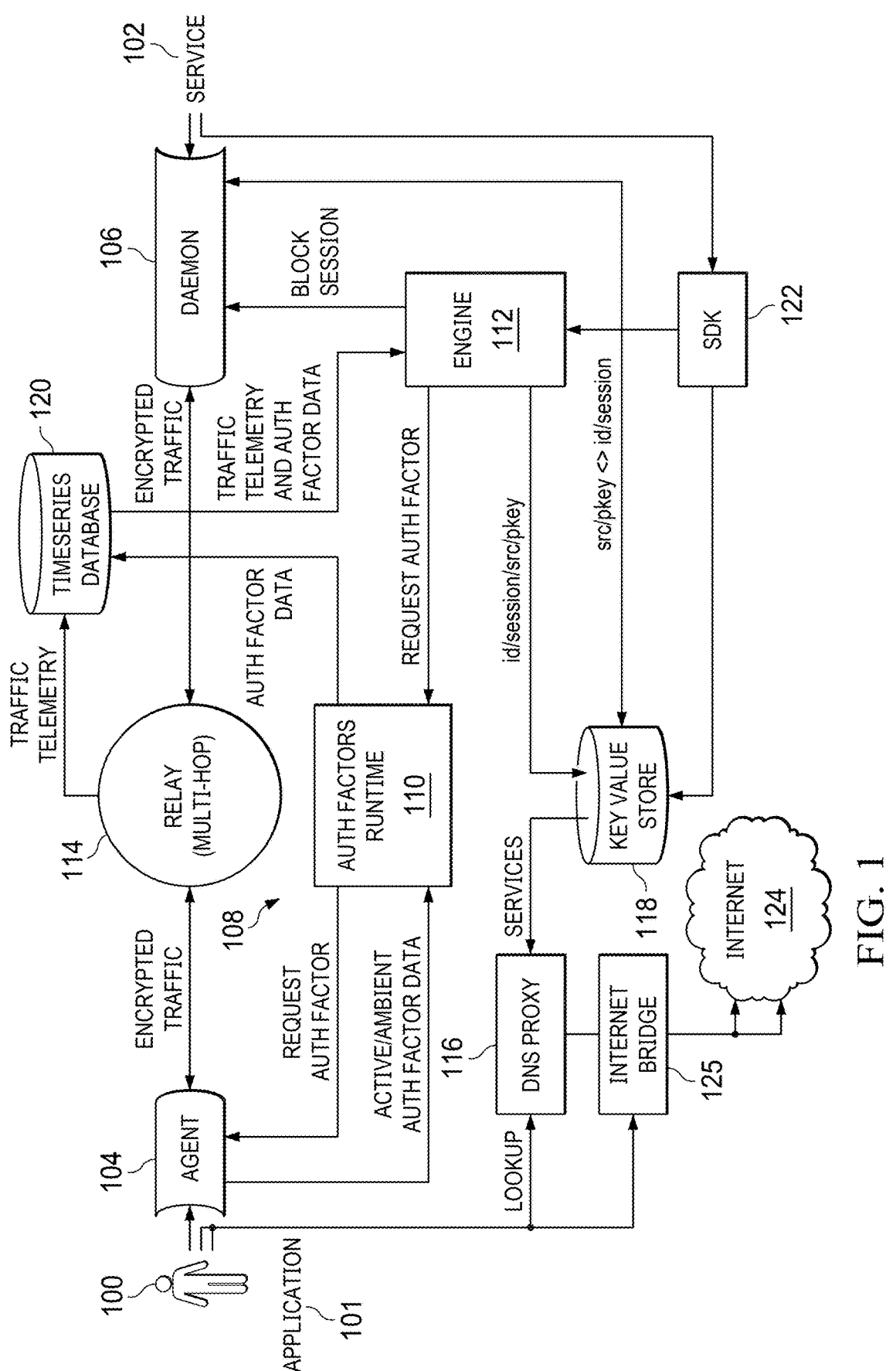
FIG. 1 depicts a representative continuous universal trust architecture of this disclosure.

As noted above, the technique of this disclosure provides for a Continuous Universal Trust (CUT) architecture that enables permitted entities (e.g., users, user groups, machines, devices, applications and the like) to access protected resources (e.g., services, sites, other machines, and the like). In one embodiment, the CUT is implemented in a core network positioned as an overlay on the publicly-accessible Internet, and preferably operates in a Software-as-a-Service manner. In a variant embodiment, the core network is physically separated (in effect "air-gapped") from the public Internet and runs as a separate and distinct network (as opposed to being an overlay), in which case communications to and from core network elements are enabled through an Internet bridge, as will be described further below. In either case, the core network may leverage a cloud computing infrastructure, and conceptually the core network sits in-between (as an intermediary) requesting entities and the protected resources (typically provided by third party service providers) that the entities are attempting to interact with. According to a first aspect of this disclosure, all (or substantially all) traffic intended for the destination entities (e.g., third party service providers, machines, or the like), and typically all responses from the destination entities and intended for the requesting entities, is routed through the CUT architecture, e.g., in an encrypted manner. This routing method and system, together with the establishment and maintenance of trust between each entity and the CUT architecture directly (as opposed to between a particular requesting entity, and an associated destination entity), enables the providing of continuous trust, as will be described. While all traffic is routed through the core in this paradigm, preferably the core network components themselves (including any CUT system operator(s)) do not have access to the content portions of the traffic due to the encryption or like protection.

As used herein, the term "site" typically refers to a website (or some protected portion thereof), but the reference to a "site" should be broadly construed to refer to any protected resource available from a server or other computing entity. The resource may be the overall site, a service endpoint, a portion of a site, a web service, an application, a web page, a document or other file, another machine or computing device, or a single protected object. When the requesting entity is a human being, that entity has an associated mobile or other computing device running one or more mobile applications (or "apps") including in one embodiment the agent application ("agent") of this disclosure, as will be described below. In a variant embodiment, an agent is not required. The mobile device may be a smartphone, tablet or wearable, an IoT device or appliance, laptop or the like. The mobile app can be downloaded and installed via a mobile application delivery service, or it may be provided as a native application on the mobile device. Just as the entity seeking the protected resource (at a third party service provider) runs an agent application, the service provider likewise runs a CUT application that is referred to herein as a daemon. Each agent (on the end user client device) or daemon (on the target service provider computing system) typically is implemented in software, e.g., as a program, process, execution thread, or the like.

In another embodiment, a source or requesting entity is a computing machine that runs the agent, and a target or destination entity is a computing machine that runs the daemon. Thus, machine-to-machine interactions through the CUT architecture are also enabled.

In a more specific embodiment, the core network in the CUT comprises one or more trust-based services, each of which is typically implemented as a set of configurable computing resources (e.g. networks, network bandwidth, servers, processing, memory, storage, applications, virtual machines, and services). Typically, the service is multi-tenant based, and it is provided on behalf of each service customer (an organization) that desires to enables end users to obtain secure access to the organization's protected resources, which may be hosted on one or more servers that are distinct from the core network (although this is not a limitation). As will be described, the continuous trust provided by the solution herein typically is implemented as an adjunct to the organization's existing authentication process flow. As noted above, in one embodiment an end user entity or device has an associated agent (that is a component of the CUT) and that is configured to execute in the user's device at a network interface therein, e.g., a local loopback interface. To obtain the agent, the user of the device (or service in the case of a web site, IoT device, or any service or business account) registers that device (or other component) with the service, e.g., according to a Know Your Client (KYC) verification (or other identity management) scheme. The particular manner by which the agent is registered to the service may vary and is not a limitation. Each registered user, service or device has an associated CUT Identifier. A typical device includes a browser. Among other tasks, the agent has the capability to monitor "ambient" factors that operate in the background and that do not require active user interaction, as well as "active" factors that involve or do require active user interaction (e.g., login operations, user interface interactions, biometrics, data generated as a result of any challenge/response, and the like). Representative ambient factors are quite varied and may include, without limitation, the following: the user's local operating environment including device characteristics, operating system, installed applications, application versions, scripts, and the like, the set of icons on the user's home screen of a mobile application, a set of bookmarks that has been established for a browser, a list of then-running processes on a device, a set of mouse movements generally, and other general or specific user behaviors that are not tied to some prompting, challenge or the like To protect privacy, ambient factor data necessarily does not expose personally-identifiable (or the like) information (PII). This locally-captured ambient and active factors data is provided as telemetry to the core network.

According to a further aspect of this disclosure, the Continuous Universal Trust (CUT) architecture is accessible by multiple entities (typically end users, devices, services, enterprises or combinations thereof) that themselves are configured according to a "circle" construct. In this paradigm, a "circle" (sometimes referred to as a "trust circle") refers to a set of entities to which a particular continuous trust policy (or more generally a security policy) is applied by the CUT architecture. Thus, and for a particular enterprise, a circle may include all of the registered users, users group or other accounts of that enterprise and that are subject to a particular continuous trust policy that will be enforced (in the same manner) for all of the entities that comprise the circle. As noted above, an end user client entity, or any service or other entity participating in CUT, and that registers with the system, has an associated CUT Identifier, and this identifier has one or more profiles, each of which corresponds to a particular circle. A given CUT Identifier may be associated with multiple circles.

Generalizing, and according to a preferred embodiment, the notion of trust with respect to the CUT architecture is built upon all interactions of an entity with other entities to provide for a universal trust paradigm. In this context, universal trust ensures that every entity on the network can be trusted (a global circle of trust), and each entity's trust is universal (a trust index or score for the entity is global). This trust is facilitated in the preferred embodiment by requiring each entity that operates in association with the CUT architecture to independently and separately authenticate itself to the core network and without regard to an authentication paradigm specific to a particular destination. Further, the notion of universality as provided for herein means that the trust is retained not just between, for example a pair of entities, but also universally across the core network. Thus, if a first entity independently (and separately from a second entity) has established trust with the core network, this trust is retained and applicable to all other communications with the core network.

As will be described, and according to a further important benefit herein, the core network facilitates authentication by the registered entities of a given circle to the protected resources defined by the circle's security policy, as well as enforcing continuous trust. Advantageously, and as will be further described, continuous trust is enabled throughout a particular interaction session between a circle's registered user and a target service provider. Thus, in a typical use case, the core network provides a registered user single sign-on (SSO) or other authentication services to facilitate the user's initial access to a target service provider, and then further enforces a continuous trust paradigm (as defined by the circle's security policy) as the user continues its interactions with the service provider during a session. Throughout this interaction, all traffic flows through the core network, but with all or part of the contents encrypted, as previously described.

FIG. 1 depicts the CUT architecture in a representative (but non-limiting) embodiment. In this embodiment, the end user 100 seeking access to a protected resource associated with a service 102 has an associated agent 104, and the service provider that provides the service 102 has an associated daemon 106. An application 101 executing on the end user device is any application functionality that generates a request for a protected resource located at the service 102. A typical application is a web browser, mobile app, native application code, or the like. As shown, the core network 108 (sometime referred to herein as an orchestration layer) comprises a number of components including an authentication factors runtime 110 that receives and manages ambient and active factors data, an engine 112 that uses the authentication factor and other data to manage and control the continuous trust processing, typically according to a circle's security policy, a relay 114 (such as Wireguard™, a secure VPN protocol and tunneling software) through which traffic flows pass, a DNS proxy 116 to facilitate hostname-based access to the continuous trust architecture and to locate services within the core network, together with one or more back-end databases and data stores, and related services. These databases and data stores include, for example: a key-value store 118 that stores authentication data, and a time-series database 120 that stores telemetry extracted from the traffic flows. As also depicted, an SDK 122 (or other such library) is provided to provide or facilitate one or more ancillary functions such as routing service traffic through the core, integrating identity management and other such services with the network, and to facilitate a third party service's leveraging of cores services. The SDK 122 typically is implemented as one or more application programming interfaces (APIs) to which third party service functions are hooked into the core network. Using these services, the SDK associates security profile(s) with circle(s) and their associated registered entities.

In this example embodiment, the DNS proxy 116 interacts with other Domain Name Services (DNS) on the publicly-routable Internet 124 in a known manner. To this end, hostnames that trigger access to the CUT architecture are received by the DNS proxy 116 (and, as necessary, Internet DNS) to obtain IP addresses of orchestration layer components, such as the relay through which traffic flows. In this embodiment, the CUT network itself is distinct from the Internet (as opposed to being an overlay), in which case an Internet bridge 125 is provided to provide a mechanism by which traffic flows enter and exit the core network, which in effect is air-gapped from the public Internet 124 otherwise. An example Internet bridge is a switch, router, proxy (e.g., Hyper), or the like. With this arrangement, the end user 100 or the participating service 102, as the case may be, safely interacts (with other entities) on the core network as opposed to the Internet generally, thereby significantly reducing the exposure of the end user or the service to Internet-based threats and attacks. While it is preferred that the end user or service always use the core network, this is not a requirement; for example, the service 102 may interact with the CUT-registered end user 100 over the core network 108 while also interacting with other end users (who are not registered with the core network) directly. In the latter case, a return path (not depicted) is provided from the service (or the daemon) to the public Internet, possibly through the Internet bridge. As also noted above, while in the preferred embodiment all communications with the Internet (by the participating entities) occur through the Internet bridge, this is not required, e.g., when the CUT is configured as an overlay on top of the publicly-routable Internet.

Referring back to FIG. 1, and as noted above, preferably all traffic originating from the client side and intended for the server-side, and vice-versa, during a session flows through the core network 108 and, in particular, through the relay 114 that is logically and physically positioned between the agent 104 and the daemon 106. As noted above, a representative relay is a secure VPN tunnel-based solution, such as Wireguard, although this is not a limitation. Wireguard provides a virtual network interface that has a unique public key (pkey) that is used to encrypt or decrypt the traffic at the tunnel endpoints. The pkey can also be used to facilitate validation of user identity, as will be described in further detail below. In an alternative embodiment, the traffic (or at least content portions thereof) is secured and delivered end-to-end with IPSec tunnels, HTTP/TCP with custom encryption, firewall-punching protocols (STUN, TURN, etc.) or the like depending on implementation. Generalizing, the nature and type of traffic that is delivered over end-to-end communication path should be broadly construed as covering any IP-based traffic regardless of the application layer, security wrapper, or the like.

Once again referring back to FIG. 1, the authentication factors runtime 110, operating in conjunction with the engine 112, provides initial and continuous authentication of the user or device during a given interaction session with the service provider. Together, module 110 and engine 112 are sometimes referred to as a controller (or continuous trust controller). As depicted, and as will be described further below, typically continuous authentication is based on authentication factors that are passed by the agent 104, such as one or more ambient factors, one or more active factors, or combinations thereof, as well as telemetry 113 extracted from the traffic flow(s). The telemetry 113 is collected as time-series data in the time-series database 120 and provided to the engine 112 for processing according to the security policy provided from the SDK 122. As depicted by the arrows, and depending on the determination(s) made by the engine, the agent may be instructed to increase the number of authentication factors that it provides to the authentication module (for evaluation of the entity's continued right to have access), or the daemon may be structured to block the session from proceeding further.

More generally, and based on one or more authentication factors and/or the telemetry, the engine is configured to dynamically change a given authentication requirement during an interaction session. Thus, in one example, at the outset of a workflow, only a first authentication requirement (e.g., weak authentication) is enforced; as the workflow continues, the engine then determines that a second authentication requirement (e.g., a somewhat higher authentication) is then needed, e.g., to ensure continued compliance with the security policy. The nature and scope of this authentication step-up in this example depends on the policy, the telemetry, and perhaps other factors (e.g., time of day, client location, service load, and others). Even later, and as the session continues, the engine may then determine to step-up the authentication requirement to an even higher level, e.g., because of the nature or type of follow-on request being made by the client. This is just a representative example, as the change that occurs to the authentication requirements may be a step-down (a relaxation) of the authentication requirement. Another example would be the authentication requirement being stepped-up, but then later returned to a lower authentication requirement. All of these examples are merely illustrative. Upon the initial authentication request, and/or whenever the engine determines that the authentication requirement should change, the engine receives the session, circle and user identifiers (and any associated PKC values), and makes the determination(s) about the nature and type of authentication requirement(s) that are then enforced (or continued to be enforced) by the system for the on-going session. To this end, the engine computes a set of trust indexes (also referred to herein as scores), typically one trust index per authentication factor, and uses this scoring data to determine if, when and to what degree the authentication requirement should be adjusted to maintain the continuous trust.

As noted above, in one embodiment a tunnel established between an end user and a service may have an associated unique public key (pkey). FIG. 1 depicts the public key being used. In addition to its use for encryption and decryption, this key may be leveraged to validate user identity. For example, assume that during a particular interaction or session the system determines or reaches a "lower confidence" in the user's identity. At this point, an agent that has access to the pkey can trigger processing of an ambient (or even an active) authentication factor, thus enabling the system to associated identity with the pkey. (As a variant, some other local key may be tied to the user's identity, or a key exchange may be used). The service daemon then uses the pkey to both decrypt the traffic and to validate that that the traffic indeed originated from the identity. How the pkey is transmitted to the daemon is implementation-specific.

Figure 2:
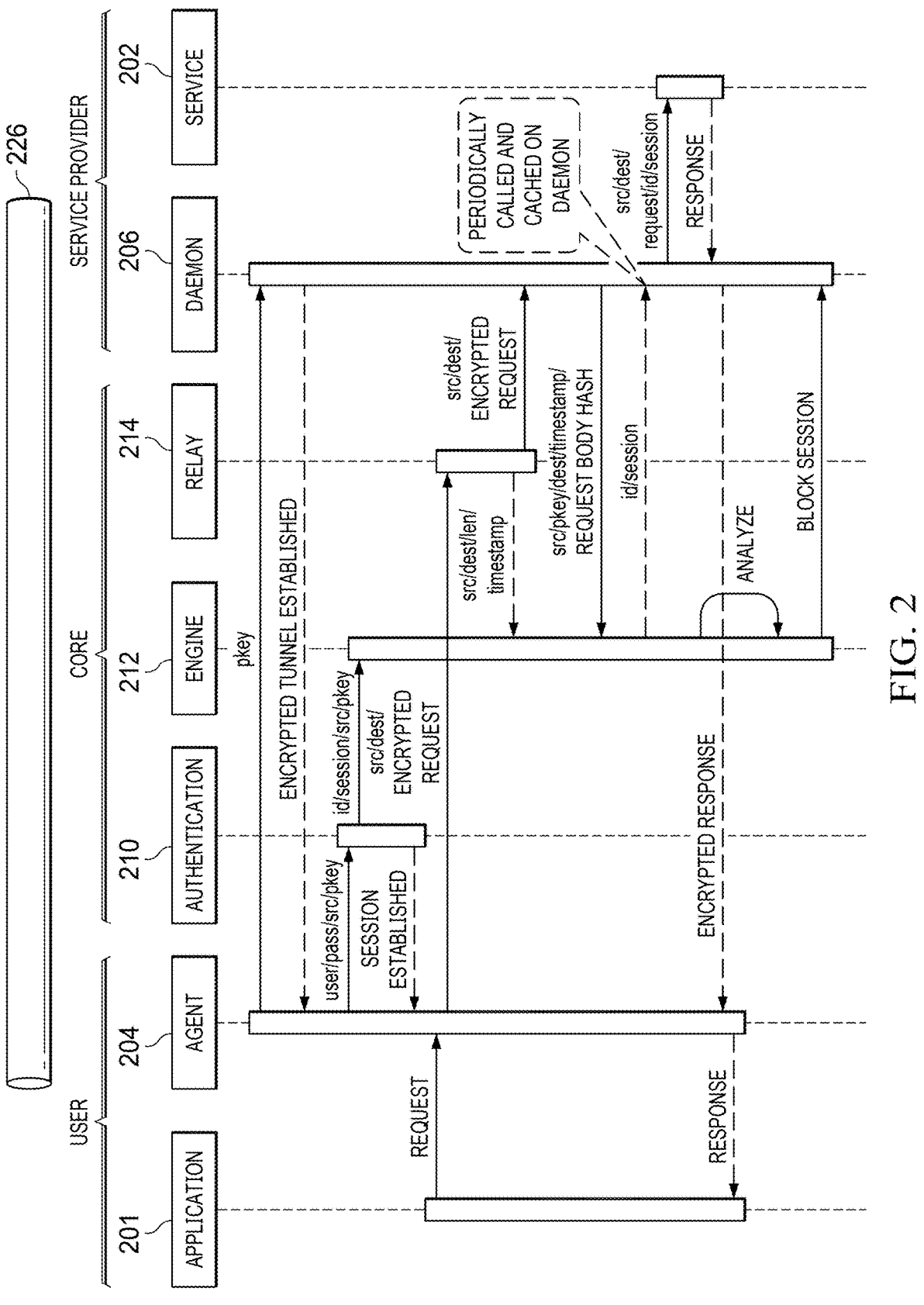
FIG. 2 depicts a visual representation of representative interactions among a user, the core network, and a service provider in the architecture depicted in FIG. 1.

FIG. 2 depicts a typical session among the user and the service provider, with traffic flows through the core. As used herein, a session typically involves a one or more client requests directed to the service provider service 202, and one or more responses to the one or more client requests directed to the client (from the service). The UML diagram depicted shows a single request, and an associated response. There is no requirement for a one-to-one correspondence between a request, and a response, or vice-versa. In this example, the request originates from application 201 and is intercepted by agent 204 operating on the device's loopback address in the usual case. As depicted, an encrypted tunnel 226 is or has been established between the agent 204 on the client side, and the daemon 206 on the server-side. The tunnel is associated with a public key (pkey) uniquely associated to the virtual network interface of the tunnel that is associated with the agent-daemon pair. Typically, there is a distinct tunnel per agent-daemon. At step (1), the agent 204 makes a request to the authentication module 210, passing a message comprising {user/pass/src/pkey}, where "user" is an identifier associated with the user, "pass" is the user's password or other secret, "src" is a source identifier for the client entity (e.g., an IP address), and "pkey" is the tunnel public key. The authentication factors runtime module 210 checks the information against the key-value store (in FIG. 1) and, if the authentication is accepted, forwards a message to the engine 212 at step (2) that comprises {id/session/src/pkey}, wherein "id" refers to the CUT Identifier, and "session" refers to the session. At step (3), the authentication module 210 notifies the agent 204 that the session (here, with the core network) is established. In response, and at step (4), the agent 204 encrypts the original request and forwards the encrypted request, together with source identifier and a destination identifier associated with the service provider, to the relay 214. In response, and at step (5), the relay 214 provides the engine 212 a message comprising {src/dest/len/timestamp}, where "len" is the length in bytes of the encrypted request and associated metadata, and "timestamp" corresponds to a time at which the relay received that encrypted request. At step (6), the relay 214 forward the encrypted request package (including the "src" and "dest"

metadata) to the daemon 206. At step (7), the daemon responds by sending the engine 212 a message comprising {src/pkey/dest/timestamp/request body hash}, where "request body hash" is a hash value that the daemon has computed over the encrypted request. The request body hash typically is computed using a hash function such as MD5, SHA-1, or the like. As depicted in step (8), the {id/session} message is periodically called and cached on the daemon 206 as a keep-alive indication for the session.

To complete the request-response flow, at step (9) the daemon 206, which has applied the public key and recovered the request (from the encrypted request), forwards that request to the service 202 in a message comprising {src/dest/request/id/session}. At step (10), the service 202 responds to the daemon 206 with the response to the request. The nature of the response of course will depend on the request. The daemon then re-applies the encryption to the service response using the key to generate an encrypted response. At step (11), the encrypted response is shown as being returned through the core network to the agent 204, which in turn removes the encryption and passes the response (in the clear) back to the application 210. This competes the request-response flow.

As also depicted in FIG. 2, and during the request-response flow (which as noted above may involve one or more requests, and one or more responses), the engine 212 performs the continuous trust analysis as indicated by the analysis operation at step (12). This is a continuous operation that, as noted above, takes into consideration the policy (circle), the authentication factors (ambient, actual, or combinations), the nature of a given request, the nature of a given response, other system, application or device metadata, and so forth, and that results in one or more control signals that maintain or modify the initial or continuing authentication requirement(s) for the given session, to thereby facilitate the continuous trust. One such control signal is depicted at step (13), as a BLOCK session signal provided by the engine 212 to the daemon 216. This results (in this example) with a termination of the session. As noted above, blocking the on-going session from continuing is just one or many possible authentication control options that include: no change, an authentication step-up, an authentication step-down, and combinations.

As noted, the above-described architecture is configured for multi-tenancy, and is highly-scalable to handle large numbers of requests from large numbers of requesting entities. As the system scales out, a continuous universal trust solution is then provided. Because preferably all traffic flows through the core network, and in addition to providing the per-session continuous authentication, the system can readily terminate sessions in the event of a cyber or other attack, and it can readily enforce circle policy compliance. Although it is described that all traffic flows occur through the core network, this may not always be possible, e.g., some video chat applications require peer-to-peer connectivity; in these circumstances, the system may whitelist certain of such applications while enforcing that the remaining traffic to and from a registered end user client and to and from a registered service provider otherwise flow through the network.

As noted above, it is not required that the system be implemented with an "agent" or a "daemon," as the functionality of these components may be built into or other integrated with the client or server, as the case may be. An "agent" that allows the system to collect and implement at least the ambient authentication factors greatly improves user experience, as this obviates one or more logins to the participating services. Also, the use of a dedicated agent that hooks into and intercepts potentially the entire traffic profile to and from the end user client enables the system to carry out more detailed behavioral analysis that is then leveraged to provide the continuous authentication. Telemetry data is readily captured as it flows through the infrastructure, all within requiring explicit SDK calls from the service provider.

Enabling Technologies

Typically, the computing platform or infrastructure that provides the core network is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user or an autonomous application, typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Authentication step-up or step-down determinations made by the engine may leverage machine learning. Thus, in a variant embodiment, the core network includes a machine learning system. The nature and type of Machine Learning (ML) algorithms that are used for determining whether changes to the continuous authentication should be implemented may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, network-accessible Internet of Things (IoT) device, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

The invention claimed is:

1. A method of continuous and universal trust in a network operating environment, comprising:

configuring a core network in the network operating environment;

for each entity of a set of entities uniquely associated to one another by a shared continuous trust paradigm defined by a security policy and enforced by the core network, establishing an authentication between the entity and the core network directly, independently and separately from an authentication between any other entity and the core network;

for at least a first entity and a second entity of the set of entities that are each authenticated to the core network independently and separately from one another, establishing a communication session through the core network;

receiving and forwarding all traffic flows between the first entity and the second entity through the core network during the communication session; and during the communication session, maintaining a continuous authentication of the first entity and the second entity by the core network dynamically adjusting authentication requirements, and wherein the first and second entities have differing authentication requirements to the core network in the communication session.

2. The method as described in claim 1, wherein the core network is configured as an overlay network in association with the network operating environment.

3. The method as described in claim 1, wherein the core network is configured as a standalone network in association with the network operating environment.

4. The method as described in claim 1, wherein the second entity is associated with a destination endpoint for the communication session, and wherein each of the first and second entities are authenticated to the core network without regard to any authentication mechanism otherwise associated with the destination endpoint.

5. The method as described in claim 1, wherein the continuous authentication includes applying one or more authentication factors to one of: the first entity, the second entity, and the first and second entity.

6. The method as described in claim 5, wherein the one or more authentication factors applied to the first entity differ from the one or more authentication factors applied to the second entity.

7. The method as described in claim 5, wherein the one or more authentication factors include one or more ambient authentication factors, one or more active authentication factors, and combinations thereof.

8. The method as described in claim 1, wherein the set of entities comprise a subset of first entities that are associated with one another in a trust circle.

9. The method as described in claim 8, further including associating the security policy with the trust circle.

* * * * *